United States Patent Office 2,727,001
Patented Dec. 13, 1955

2,727,001

DRILLING FLUID

David A. Rowe, Houston, Tex., assignor to Sun Oil Company, Philadelphia, Pa., a corporation of New Jersey No Drawing. Application December 24, 1952,
Serial No. 327,901

10 Claims. (Cl. 252—8.5)

This invention relates to drilling fluid for use in the rotary drilling of wells and more particularly to aqueous drilling fluid compositions having enhanced viscosity, stability, and water loss characteristics. The drilling fluid compositions according to the invention are especially suitable for use in the presence of salt.

In drilling wells such as oil or gas wells, the drilling fluid which is circulated into and out of the borehole should have certain properties so that it will perform its desired functions properly. One important characteristic of the fluid is viscosity. It is essential that the fluid have sufficient viscosity to suspend the drill cuttings so that they will be carried from the borehole but the viscosity should not be so high as to render the pumping operation difficult. It is generally desirable that the Stormer viscosity of the drilling fluid be at least 10 and less than 100 centipoises and a more preferable range is 20–40 centipoises. The most common drilling fluids are prepared by dispersing a colloidal clay such as bentonite in water, the clay being added in sufficient amount to impart the desired degree of viscosity to the mixture. Weighting material, such as barytes, iron oxide, et cetera, may also be added.

Another desirable characteristic of the drilling fluid is its wall building characteristic, or the ability to form a thin mud sheath on the wall of the borehole that will prevent loss of water to the formations traversed. The customary procedure for improving water loss characteristics of aqueous drilling fluid is by adding a suitable organic colloid, such as starch or carboxymethylcellulose to the mud composition until the water loss is reduced to a desirably low level.

It is well known that the ordinary drilling mud comprising bentonitic clay dispersed in water is unsatisfactory for use under conditions in which the mud contains or becomes contaminated with salt. Soluble salts of sodium, calcium, magnesium and the like are often encountered during drilling, as when the drill penetrates a brine-containing formation or a formation such as a salt dome, salt bed, gypsum, anhydrite and the like. Also, in coastal regions salt water may be the only available source of water for preparing the drilling mud, so that it, of necessity, will contain salt. In other instances salt is purposely added to the drilling fluid at some point in the operation and attempt is made to stabilize the mixture by addition of special materials in anticipation of drilling into a salt-containing formation. The presence of salt in the drilling mud, generally in amount above 10,000 p. p. m. tends to cause flocculation and sedimentation of the clay particles from the aqueous phase. Flocculation results in a decrease in viscosity and an increase in water loss. When the salt is present in sufficiently high concentration, the viscosity will become so low that the mixture will have no utility as a drilling fluid.

In order to avoid the difficulties resulting from the presence of salt, it has been general practice, heretofore, to employ a special type of clay in preparing the mud composition. This clay, which is a certain type of zeolite found in the Georgia-Florida area as described in United States Letters Patent No. 2,044,758, does not undergo flocculation in the presence of salts and therefore will maintain the desired viscosity of drilling muds prepared from salt water, or of muds which become contaminated by salts during the drilling. With this type of clay, however, it has been found that relatively large amounts of starch are required in order to reduce the water loss properties of the mud to a desirably low value.

It has now been found that aqueous drilling muds prepared from the more common types of colloidal clays can be rendered suitable for use in the presence of salt by incorporating therein finely divided asbestos obtained from the mineral chrysotile. The presence of this particular type of asbestos in some manner not fully understood prevents flocculation of the clay particles due to salt and maintains the viscosity of the mixture at a desired value. Thus, according to the invention, an improved aqueous drilling mud is prepared by admixing water with a colloidal clay and with finely divided asbestos derived from chrysotile.

There are six different types of asbestos known commercially, which are obtained from the following minerals: chrysotile, amosite, anthophyllite, crocidolite, tremolite and actinolite. (See "Asbestos, a Mineral of Unparalleled Properties" by M. S. Badollet, Transactions of the Canadian Institute of Mining and Metallurgy, vol. LIV, 1951, pages 151–160). The term "asbestos" is used as a generic designation of these various types. The fibers obtained from these minerals vary from soft, flexible fibers of good spinnability to harsh, brittle fibers having poor spinnability.

Of these various types of asbestos, only one—namely, chrysotile asbestos—is suitable for preparing a drilling mud in accordance with the present invention. While asbestos derived from chrysotile will vary in properties dependent upon the deposit from which the chrysotile is obtained, nevertheless any chrysotile asbestos is effective for use in the present invention. It is preferred to employ chrysotile which yields soft, flexible fibers, as this kind is most effective in preventing or minimizing flocculation of clay particles in the presence of salt; but it has been found that chrysotile of the kind which yields harsh, brittle fibers is also effective although not to the same degree. On the other hand, it has been found that asbestos derived from any of the minerals other than chrysotile is substantially ineffective in avoiding the undesirable flocculating effect of salt on the clay particles. This may be due to the fact that chrysotile fibers are positively charged, whereas fibers derived from the various other minerals from which asbestos is made are negatively charged. It is not definitely known at present, however, whether or not the type of electric charge carried by the fibers plays an important role in determining the effectiveness of the asbestos. Grades of asbestos which are especially useful for the present purpose are obtainable, for example, from chrysotile deposits in Vermont, Quebec and Ontario.

The degree of effectiveness of chrysotile asbestos in the present invention is also dependent upon the extent of purification achieved during its manufacture. Commercial preparation of asbestos involves milling followed by suitable separation procedures, such as washing or air flotation, and usually a number of different grades of asbestos of varying purity are produced. Some of the products may contain a relatively high proportion of serpentine rock dust or other impurities while others may be essentially chrysotile fibers in a high state of purity. It has been found that any of the commercial chrysotile products containing a substantial proportion of chrysotile fibers are effective for the present purpose and that the effectiveness increases with increasing purity. However, since the more highly purified products are more expensive, it may often be more economical in practicing the present invention to use fibers of lower purity but in increased amount sufficient to impart the desired viscosity and stability characteristics to the drilling mud composition.

The asbestos incorporated in the drilling mud should be of a fineness such that it will pass 16 mesh (U. S. Sieve Series) and more preferably of a fineness such that it will pass 50 mesh. It has been found that, as a practical matter, grinding of the more flexible forms of chrysotile asbestos is facilitated by adding clay to the asbestos and grinding the two together. Clay in amount of at least twenty-five (25%) per cent by weight aids the grinding and handling of the ground product and it is preferable to use at least fifty (50%) per cent clay. The resulting mixture of finely divided clay and asbestos can then be used conveniently as an additive for supplying to the final mud composition the desired amount of asbestos. Weighting agents may be added to the mud when required to give the desired weight, and oil may be dispersed in the mixture if an emulsion type mud is desired.

The amount of asbestos employed in preparing a drilling fluid according to the invention should be sufficient to maintain its viscosity substantially above that of water, and it usually will be desirable to use an amount such that the Stormer viscosity of the drilling mud composition will be within the range of 10–100 centipoises, more preferably, 20–40 centipoises. An increase in the amount of asbestos increases the viscosity of the resulting composition, so that the amount to use in any given case will depend on the viscosity desired. As a general rule, the ratio of asbestos to clay in the composition should be at least 2:98 on a weight basis. With most grades of chrysotile asbestos that are available commercially, it usually will be desirable to use an amount of asbestos such that the asbestos to clay ratio in the mud composition is at least 5:95 and typically of the order of 10:90. In order to obtain the desired properties of the drilling fluid, a considerably higher asbestos:clay ratio may be required in some instances but it seldom will need to exceed 30:70.

As the clay component of the drilling fluid, any known or suitable colloidal clay having base exchange properties can be used. This includes the bentonitic clays, kaolin and zeolitic clays of the Florida-Georgia type; and for the present purposes, shales may be considered as also included. The invention has outstanding utility in the preparation of a salt resistant mud from the bentonitic type of clays, which clays are much more widely available than the special zeolitic clays heretofore used in preparing salt water muds. However, the use of finely divided asbestos of the type described in conjunction with the zeolitic clays also is advantageous in that the volume yield of mud for a given weight of total solids added to secure a mud of a given viscosity is substantially increased, and furthermore the requirements of organic colloid additives, such as starch, for securing a satisfactorily low water loss are substantially reduced.

In locations where the only available water supply is salt water, practice of the present invention will involve adding finely divided asbestos to the drilling mud when it is originally prepared. In other locations the drilling operation may be started with a conventional mud which is subsequently converted to a composition according to the present invention by the addition of finely divided asbestos at any time this may become desirable or necessary. This usually will be when the mud, during the course of drilling, becomes sufficiently contaminated with sodium chloride or other soluble salts that flocculation difficulties are likely to occur, for example, when the salt content of the mud increases to above 10,000 p. p. m.

Incorporation of the finely divided asbestos in the mud will then maintain the viscosity at the desired level and also avoid excessive water loss with a smaller amount of organic colloid additive.

The following examples are illustrative of the invention and advantages derived therefrom:

Example I

Four mud compositions were prepared, each of which contained 315 cc. of saturated salt water and 22 g. of dispersed clay or clay-asbestos solids. One of the compositions had no asbestos while the others had varying amounts of asbestos. Wyoming bentonite and Quebec chrysotile asbestos ground to a fineness such that it passed 50 mesh were used in each case. The compositions had the following Stormer viscosities:

|   | Weight ratio of Asbestos to Clay | Viscosity, cp. |
|---|---|---|
| #1 | (no asbestos) | 1 |
| #2 | 5:95 | 14 |
| #3 | 10:90 | 26.5 |
| #4 | 15:85 | 38 |

These results show the effect of increasing the amount of asbestos in raising the viscosity to a desirable level. Under these conditions, in order to secure a viscosity of above 10, the proportion of asbestos to clay should be at least 4:96; and for a viscosity above 20, the proportion should be at least 8:92.

Example II

Another set of compositions was prepared in the manner specified in Example I except that fresh water was used, with results as follows:

|   | Weight ratio of Asbestos to Clay | Viscosity, cp. |
|---|---|---|
| #1 | (no asbestos) | 15 |
| #2 | 5:95 | 19 |
| #3 | 10:90 | 26.5 |
| #4 | 15:85 | 30 |

These results show that the addition of chrysotile asbestos to a fresh water mud increases the viscosity.

Example III

Five mud compositions were prepared, each of which contained 315 cc. of saturated salt water and 22 g. of dispersed clay or clay-asbestos solids. One of the compositions had no asbestos while the others had varying amounts of asbestos. A Texas bentonite and Quebec chrysotile asbestos ground to a fineness such that it would pass 50 mesh were used in each case. The compositions had the following Stormer viscosities:

|   | Weight ratio of Asbestos to Clay | Viscosity, cp. |
|---|---|---|
| #1 | (no asbestos) | 1 |
| #2 | 9.1:90.9 | 3 |
| #3 | 13.7:86.3 | 12 |
| #4 | 18.2:81.8 | 22 |
| #5 | 22.7:77.3 | 24 |

These results show the effect of increasing the amount of asbestos in raising the viscosity to a desirable level. Under these conditions, in order to secure a viscosity of above 10, the proportion of asbestos to clay should be at least 13:87; and if a viscosity of at least 20 is desired, the proportion should be about 17:83.

Example IV

A comparison was made between a salt water mud prepared according to the present invention and one prepared from a zeolitic clay of the Georgia-Florida type, specially produced commercially for salt water use. The zeolitic clay mud contained 22 g. of clay, while the mud of the present invention contained 4 g. of chrysotile asbestos and 18 g. of Texas bentonite, the total solids content of the mixes thus being the same. The asbestos was a Quebec product and was ground to a fineness such that it would pass 50 mesh. Stormer viscosities of these compositions after five minutes of mixing and after sixty minutes of mixing were determined to be as follows:

|  | Zeolite Mud | Asbestos-Clay Mud |
|---|---|---|
| After 5 minutes | 3 | 17 |
| After 60 minutes | 23.5 | 33 |

These results show that the asbestos-clay mixture was more effective in improving viscosity than was the special Georgia-Florida zeolitic clay.

Example V

The asbestos-clay mud of the preceding example was stirred at low speed for 96 hours to determine whether or not the mixture would be relatively stable over a prolonged period. At the end of this time no tendency toward flocculation was observed.

Example VI

Additional comparative runs to determine water loss properties were made with a zeolitic clay mud and an asbestor-bentonite clay mud prepared as described in Example IV, but also containing pre-gelatinized starch in amounts of 2 and 4 lbs./bbl. The A. P. I. 30-minute water loss values of the mud compositions were determined to be as follows:

| Amount of Starch, lbs./bbl. | A. P. I. Water loss, cc. | |
|---|---|---|
|  | Zeolite Mud | Asbestos-Clay Mud |
| 2 | 59 | 16 |
| 4 | 16 | 7 |

These results show that the amount of starch required for effectively lowering the water loss is less for the mud prepared according to the present invention. For example, 4 lbs. of starch per bbl. was required to reduce the water loss of the zeolite clay mud to the same level as was obtained with 2 lbs./bbl. with asbestos-containing mud.

Example VII

Three comparative batches of drilling mud were prepared comprising Wyoming bentonite in saturated salt water. The first contained no asbestos and the other two contained varying amounts of a Johns-Manville asbestos designated as 6D20 (standard Canadian chrysotile asbestos classification), a soft flexible type of Canadian chrysotile. Each was prepared by adding to 315 cc. of saturated salt water 22 g. of the bentonite or bentonite-asbestos mixture and then mixing in a high speed Waring Blendor for 5 minutes. Viscosity measurements were then made with a Stormer viscosimeter and the values were expressed in terms of the number of grams of driving weight required to cause the spindle to rotate through a specified number of revolutions in 10 seconds. Thereafter the mixtures were allowed to stand and were observed to determine how much clear aqueous layer separated at the top. Results were as follows:

|  | Grams in Mixture | | Viscosity, g. driving weight for 10 seconds | Amount of clear water at top |
|---|---|---|---|---|
|  | bentonite | asbestos | | |
| #1 | 22 | 0 | 74 | 1⅛″ in 24 hrs. |
| #2 | 21.3 | 0.7 | 126 | None in 24 hrs. |
| #3 | 20 | 2 | 190 | Do. |

These results show that the asbestos inhibited flocculation of the clay particles, thereby causing the viscosity to be considerably higher than that of the mixture to which no asbestos was added and also preventing separation of clear water from the composition.

Example VIII

Two other batches of drilling mud were prepared in exactly the same manner as in the preceding example, but in this case purified asbestos samples derived from two types of Arizona chrysotile were used. One of the asbestos samples was the harsh, brittle type while the other was the soft, flexible type. In each case 2 g. of asbestos was used in admixture with 20 g. of Wyoming bentonite. Tests were made in the same manner as described in Example VII for comparison with the results therein listed.

|  | Type of Asbestos | Viscosity, g. driving weight for 10 seconds | Amount of clear water at top |
|---|---|---|---|
| #4 | Arizona—harsh | 130 | ½″ in 24 hours. |
| #5 | Arizona—soft | (Solid) | None in 24 hours. |

These results show that the harsh type of chrysotile is effective in increasing viscosity and in improving stability of the mixture but that it is not nearly so effective as the soft type. The fact that mixture #5 was solid even though it contained only 2 grams of the soft chrysotile means that this form of asbestos is so effective that only a very small proportion need be used to secure the desired viscosity. Its effectiveness is thought to be due not only to its type (i. e. soft, flexible fibers) but also to the fact that it had been highly purified.

Example IX

Four other compositions were prepared for comparison with those of Examples VII and VIII. These were prepared and tested in the same manner as described in those examples, employing 2 g. of asbestos and 20 g. of Wyoming bentonite, but in this instance the asbestos samples were derived from other minerals as listed below.

|  | Type of Asbestos | Viscosity, g. driving weight for 10 seconds | Amount of clear water at top |
|---|---|---|---|
| #6 | crocidolite—soft | 74 | ¹⁄₁₆″ after 24 hrs. |
| #7 | amosite—harsh | 74 | ⅛″ after 3 hrs. |
| #8 | tremolite—harsh | 60 | Do. |
| #9 | anthophyllite—harsh | 74 | ¾″ after 24 hrs. |

Since the comparative composition containing no asbestos had a viscosity of 74 as shown in Example VII, it can be seen that the types of asbestos used in mixtures #6–#9 were wholly ineffective in increasing viscosity even though some stabilization of the mixtures against separation evidently resulted. The failure to increase viscosity is interpreted as due to the inability of these types of asbestos to inhibit flocculation of the clay particles in the presence of salt, at least in the manner or to the extent effected by chrysotile.

It is recognized that prior disclosures have suggested the use of asbestos, among numerous other fibrous or flaky materials, for use in drilling mud as an agent for preventing what is referred to in the art as "lost circulation." This involves using relatively long fibers which will form a mat on the borehole wall adjacent to any formation that is sufficiently porous that the mud fluid as a whole would otherwise enter it and thus not be returned from the well for re-use. In the present invention, however, the asbestos is ground to a fineness at which it would be incapable of preventing lost circulation and at which it has a heretofore unrecognized characteristic, namely, the ability to increase viscosity of the mud composition and prevent an increase in water loss due to flocculation of the clay particles. To achieve this purpose satisfactorily, the asbestos has to be of the special type as heretofore specified.

This application is a continuation-in-part of my copending application, Serial Number 313,190, filed October 4, 1952 (now abandoned).

I claim:

1. An aqueous drilling fluid comprising a colloidal clay dispersed in water and having incorporated therein chrysotile asbestos of a fineness such that it will pass 16 mesh, said asbestos being present in amount sufficient to substantially increase the viscosity of the drilling fluid.

2. An aqueous drilling fluid comprising a colloidal clay dispersed in water and having incorporated therein finely divided asbestos derived from chrysotile, said asbestos having a fineness such that it will pass 16 mesh and being present in a weight proportion to the clay of at least 2:98.

3. A drilling fluid according to claim 2 wherein the asbestos has a fineness such that it will pass 50 mesh.

4. A drilling fluid according to claim 2 wherein the asbestos has a fineness such that it will pass 50 mesh and the amount of asbestos is sufficient to maintain the Stormer viscosity of the drilling fluid within the range of 10–100 centipoises.

5. A drilling fluid according to claim 4 wherein the amount of asbestos is sufficient to maintain the Stormer viscosity within the range of 20–40 centipoises.

6. An aqueous drilling fluid comprising a colloidal clay dispersed in water and having incorporated therein finely divided asbestos derived from chrysotile of the type yielding soft, flexible fibers, said asbestos having a fineness such that it will pass 50 mesh and being present in amount sufficient to substantially increase the viscosity of the drilling fluid.

7. A drilling fluid comprising salt water having dispersed therein a colloidal clay and finely divided asbestos derived from chrysotile, said asbestos having a fineness such that it will pass 16 mesh and being present in a weight proportion to the clay of at least 2:98, and in amount sufficient to substantially inhibit flocculation and settling of the clay particles.

8. A drilling fluid according to claim 7 wherein said colloidal clay is bentonite.

9. A drilling fluid comprising salt water containing at least 10,000 p. p. m. of salt and having dispersed therein a bentonitic clay and chrysotile asbestos of a fineness such that it will pass 50 mesh and of the type yielding soft, flexible fibers, said asbestos being present in a weight proportion to the clay of between 2:98 and 30:70.

10. A drilling fluid according to claim 9 wherein the salt water is saturated salt water.

References Cited in the file of this patent

UNITED STATES PATENTS

| | | |
|---|---|---|
| 1,629,714 | Kraus | May 24, 1927 |
| 2,214,366 | Freeland et al. | Sept. 10, 1940 |